United States Patent [19]

Nakamura et al.

[11] 4,355,325
[45] Oct. 19, 1982

[54] WHITE BALANCE CONTROL SYSTEM

[75] Inventors: Takashi Nakamura, Hadano; Akio Sakashita, Yokohama, both of Japan

[73] Assignee: Sony Corporation, Tokyo, Japan

[21] Appl. No.: 245,612

[22] Filed: Mar. 19, 1981

[30] Foreign Application Priority Data

Mar. 24, 1980 [JP] Japan .................................. 55-37154

[51] Int. Cl.³ .......................................... H04N 9/535
[52] U.S. Cl. .................................................... 358/29
[58] Field of Search ............................ 358/29, 10, 42

[56] References Cited

U.S. PATENT DOCUMENTS 4,249,197  2/1981  van Spaandonk et al. ............. 358/29

Primary Examiner—John C. Martin
Attorney, Agent, or Firm—Hill, Van Santen, Steadman, Chiara & Simpson

[57] ABSTRACT

A white balance control system for a television camera wherein the levels of the red, green and blue signals are compared and supplied to updown counters which are operated based on the relative values of the color signals and based on the detected and stored information, one of a plurality of color filters is selected for use with the video camera so as to provide the correct white balance.

10 Claims, 2 Drawing Figures

WHITE BALANCE CONTROL SYSTEM

BACKGROUND OF THE INVENTION

1. Field of the Invention

This invention relates in general to a color television camera and particularly to a white balance control and memory system for use with a color television camera.

2. Description of the Prior Art

It is well known in the art of television cameras to provide a white balance adjusting circuit which includes a gain control circuit and the gain of the gain control circuit is varied so as to maintain the levels of the red, green and blue signals R, G and B equal while a color camera images a plate of an achromatic color such as white. Generally, circumferential light such as natural light and illumination light has an inherent color temperature and before electrically adjusting a color temperature adjusting circuit, suitable color temperature filters which are optical filters are selected for the rough adjustment.

In prior art color television cameras, only a single set of memories are provided for setting and storing the white balance control signal corresponding to a plurality of color temperature filters and it becomes necessary each time the filters are changed to adjust the white balance again. Especially with a portable color television camera, such as used for news gathering and which may be a portable color television camera which is moved between outdoors and indoors while recording the news the filter must be frequently changed.

In the prior color television cameras which have only a single memory new white balance data has to be taken each time a change in environment occurs. This results in time consuming adjustments which is a disadvantage for the operation of color cameras as, for example, for electronic news gathering.

SUMMARY OF THE INVENTION

It is a primary object of this invention to provide a new white balance control system of a color television camera.

Another object of the invention is to provide a novel memory system for a color white balance control system in a color television camera.

A further object is to present a white balance control memory arrangement which can be switched in response to positions of a color temperature filter disk.

According to the present invention, a plurality of white balance memories are provided which correspond to a plurality of color temperature compensating filters mounted on a filter disc. The plurality of white balance memories are switched in response to the filter disk position and are then used.

The white balance control system of the invention is particularly suitable for using portable television cameras such as are used for electronic news gathering.

According to an aspect of the invention, a white balance control system for a color television is provided which:

(A) has gain control means for electrically adjusting the white balance of a color video signal which is to be derived, (B) includes level setting means connected to the gain control means for supplying level setting signals to the gain control means, and (C) means for selecting and selectively supplying one of the level setting signals to the gain control means.

Other objects, features and advantages of the present invention will become apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

The white balance control system of the present invention includes a plurality of color temperature compensating filters which are changed to obtain the optimum white balance adjustment for the change-over color temperature compensating filter and where the apparatus allows automatic adjustment and selection of the filters.

Figure 1:
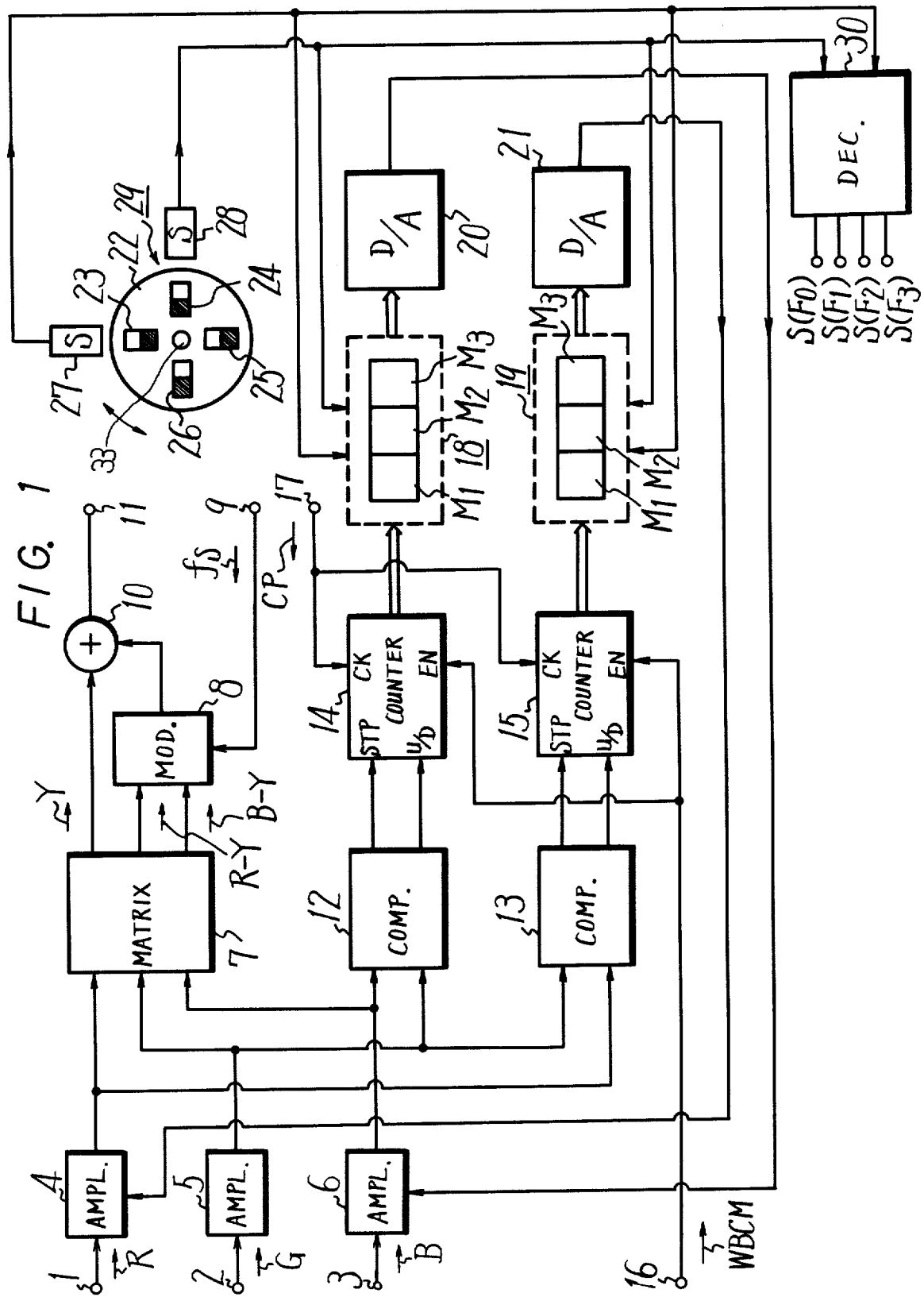
FIG. 1 is a block diagram illustrating an example of the white balance control system according to the present invention.

As illustrated in FIG. 1, the white balance control system of the invention receives on input terminals 1, 2 and 3 respectively, the red, green and blue color signals R, G and B which are supplied from an image pickup tube system, not illustrated in FIG. 1. When the white balance is to be adjusted, a white board is placed in front of the image pickup tube system. The R, G and B signals received from the image pickup tube such as a color television camera are respectively, applied to amplifiers 4, 5 and 6 which supply their output to a matrix circuit 7 which composes and produces a luminance signal Y and two color difference signals R-Y and B-Y as is well known. In the case of the NTSC color television system, two color difference signals R-Y and B-Y are fed from the matrix 7 to a modulator 8 which also receives a color subcarrier signal $f_s$ at a frequency of 3.58 MHz which is applied from the input terminal 9. The color subcarrier signals $f_s$ is orthogonally modulated by the color difference signals R-Y and B-Y by the modulator 8. The chrominance signal thus produced is applied to a mixer or adding circuit 10 which also receives the luminance signal Y from the matrix 7 and composite video signals of the NTSC are produced and supplied to an output terminal 11.

In the invention, a pair of level comparators 12 and 13 for the automatic white balance adjustment determines whether the levels of the red and blue signals R and B from the amplifiers 4 and 6 are higher or lower than the green signal G from the amplifier 5. Thus, the level comparator 12 receives inputs from the amplifiers 5 and 6 and the level comparator 13 receives inputs from the amplifiers 4 and 5. The detected outputs from level comparators 12 and 13 are respectively applied to the up/down counters 14 and 15. The automatic white balance adjustment is made such that the gains of the amplifiers 4 and 6 in the gain control circuits are adjusted for the levels of blue, red and green signals so that they are the same when a white board is being scanned by the television camera.

When the levels of the signals which are compared in the level comparators 12 and 13 are different, the compared outputs from the comparators 12 and 13 will be high or low and these are respectively applied to the up/down control terminals U/D of the counters 14 and 15 to cause them to count up or count down, respectively. On the other hand when the levels of the signals to be compared are substantially equal, the outputs of the level comparators 12 and 13 will be applied to stop control terminals STP of the counters 14 and 15 so as to stop the counters from counting up or down. When a white balance adjusting command signal WBCM is applied to terminal 16 it is connected to an enable terminal EN of each of the counters 14 and 15 which puts them into the standby condition for operation. The counters 14 and 15 each count clock pulses CP which are applied to the counters at clock terminals CK from a terminal 17. A field pulse such as the vertical pulse at a frequency of 60 Hz can be used as the clock pulse CP. The contents of the counters 14 and 15 are respectively applied to RAMs (random access memories) 18 and 19 which are the memory means for storing and recording the counter outputs. Digital to analog converters 20 and 21 are connected to the outputs of the RAMs memories 18 and 19 and convert the digital output signals of the memories to analog signals such as DC control signals.

The DC control signals from the digital/analog converter 20 is connected to the gain control terminal of amplifier 6 to control its gain and the DC control signal from the digital to analog converter 21 is supplied to the gain control terminal of the amplifier 4 to control its gain. The counted values appearing at the output of the counters 14 and 15 at the time when the count stop signals are applied by the comparators 12 and 13 constitute the values of the white balance control signals and these values are written into and stored in the RAMs 18 and 19 and are also digital to analog converted and then fed back into the gain control system to the amplifiers 4 and 6 for the white balance adjustment.

In the example of the invention illustrated in FIG. 1, the RAMs memories 18 and 19 each are provided with, for example, three sets of memory portions with addresses $M_1$, $M_2$ and $M_3$ and these portions of their memory store white balance adjustment signals corresponding to the three color temperature compensating filters which are to be utilized.

A switch or change-over position detecting means 29 consists of a rotary disk 22 upon which are mounted magnets 23, 24, 25 and 26 spaced 90° relative to each other and which correspond to the position of three color temperature compensating filters and a single opaque filter which structures will be described later. Mounted adjacent the magnet carrying disk 22, are a pair of sensors 27 and 28 spaced 90° relative to each other adjacent the outer periphery of the rotary disk so as to detect the magnets 23 through 26. The magnets 23 through 26 are rod-shaped magnets and the portions which are shown hatched in FIG. 1 comprise the North Pole and the unhatched portion comprises the South Pole. It is to be noted that the magnets 23 and 24 have their south polesclosest to the outer periphery of the disk 22 and the magnets 25 and 26 have their North poles positioned nearest the outer periphery of the rotary disk 22. When for example the north poles of the magnet are adjacent the sensors 27 and 28, the sensors 27 and 28 each produce high level detected signals. Alternatively, when the south poles are adjacent the sensors 27 and 28, the sensors produce low level detected signals. Thus, the sensors 27 and 28 will produce binary output logic signals corresponding to "00", "01", "11" and "10" which correspond to the four rotary positions of the rotary disk 22. The output signals which are detected by the sensors 27 and 28 are respectively supplied to the RAMs 18 and 19 to switch them to the associated portion of the memory $M_1$, $M_2$ and $M_3$, respectively. For example, "00" may correspond to an opaque filter $F_0$ illustrated in FIG. 2. The signals "01", "11" and "10" correspond, for example, to color temperature filters $F_1$, $F_2$ and $F_3$ illustrated in FIG. 2, respectively. Also, the respective memory portions addresses $M_1$, $M_2$ and $M_3$ of each of the RAMs 18 and 19 will be selected by the detected output signals "01", "11" and "10".

The detected signals from the sensors 27 and 28 are also supplied to a display decoder 30 which then produces outputs $S(F_0)$, $S(F_1)$, $S(F_2)$ and $S(F_3)$. These signals are supplied to four light emitting diodes, respectively, which are mounted within a view finder of the television color camera so that the operator can observe them as he uses the camera. The energization of the light emission diodes by the display decoder 30 tells the operator which of the filters is in use.

Figure 2:
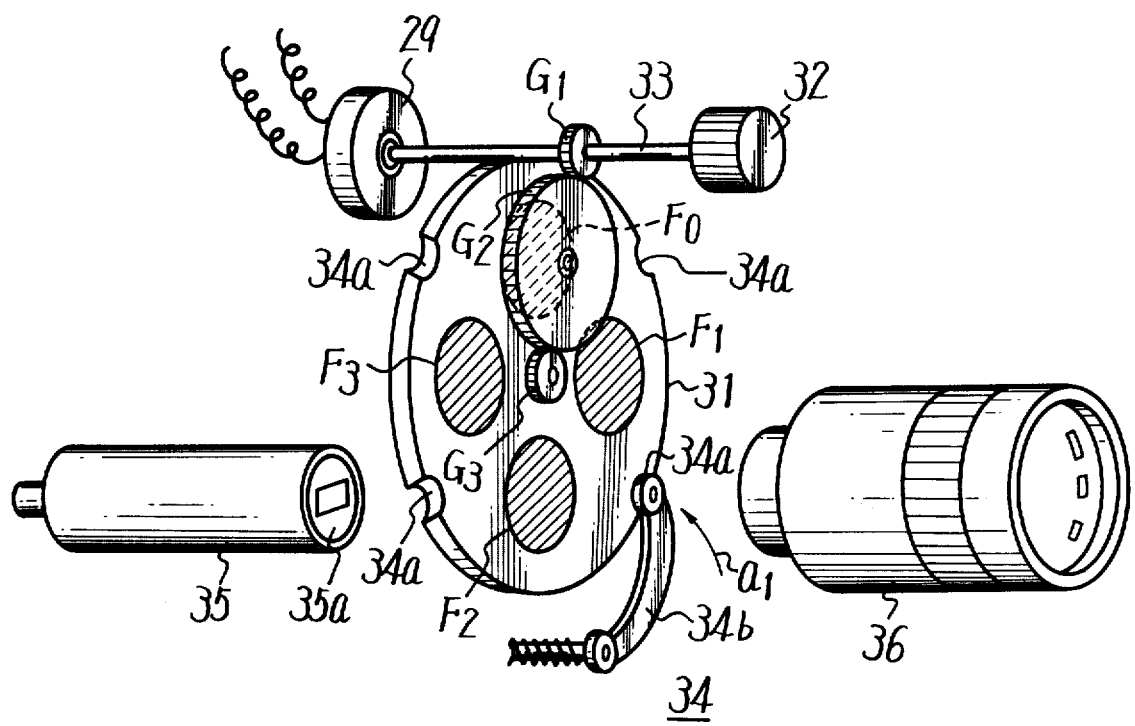
FIG. 2 is an exploded perspective view showing portion of the color television camera with the filter changing means.

As illustrated in FIG. 2 which comprises an exploded view showing the essential parts of a color television camera, a rotary disk 31 has mounted therein a disk shaped opaque filter $F_0$ and three disk shaped color temperature compensating filters $F_1$, $F_2$ and $F_3$. These filters are mounted and embedded in the disk 31 90° relative to each other and symmetrical with the center of the rotary disk 31 as shown in FIG. 2. The rotary disk 31 can be rotated by a knob 32 which is connected to a shaft 33 which carries a gear $G_1$ which meshes with a gear $G_2$ mounted offcenter on the disk 31. The gear $G_2$ meshes with a gear $G_3$ connected to the disk 31 and mounted at its center such that rotation of the knob 32 and shaft 33 rotates the disk 31 to select one of the filters $F_0$ and $F_1$ through $F_3$. The shaft 33 is also connected to the disk 22 of the switch or change-over means 29. The gear $G_3$ has the same number of teeth as the gear $G_1$ and the gear $G_2$ has a larger number of teeth than the gears $G_1$ and $G_2$. A detent means 34 engages the disk 31 and the disk 31 is formed with four depressions 34a in the outer periphery spaced 90° relative to each other and a follower 34b is spring biased at one end and has its opposite end engageable with the periphery of the disk 31 and is receivable in the depressions 34a to hold the disk 31 in one of four angular positions. Thus, the detent means 34 assures that the rotary disk 31 can be stopped at four specific positions and thus either the light opaque filter $F_0$ or one of the color temperature compensating filters $F_1$, $F_2$ or $F_3$ will be mounted between the image pickup surface 35a of an image pickup tube 35 and a lens mount 36.

Thus, according to the invention, the white balance adjusting circuit for the color television camera of the invention allows the plurality of level setting circuits $M_1$ to $M_3$ which correspond to the plurality of color temperature compensating filters $F_1$, $F_2$ and $F_3$ to be utilized. In response to the change-over of the plurality of color temperature compensating filters $F_1$ through $F_3$ the outputs from the corresponding level setting circuits $M_1$ through $M_3$ will be selectively applied to the gain control circuits 4 and 6 for making white balance adjustment. Thus, the white balance adjustment is accomplished by scanning a white plate with the corresponding color temperature compensating filters $F_1$, $F_2$ and $F_3$ under the circumferential light at the associated color temperatures. If the control values of the gain control circuits 4 and 6 which are obtained during such scanning are stored and retained in the memory portions $M_1$ through $M_3$ of the RAMs 18 and 19 which serve as the level setting circuits, when the plurality of color temperature compensating filters $F_1$ through $F_3$ are thereafter changed over, the optimum white balance adjustment which corresponds thereto can be automatically accomplished and the correct color will be reproduced. Thus, the invention can be applied to a color television camera such as a portable color television camera for gathering news which is frequently moved to different places so as to produce high quality and accurate colors.

Thus, in use by manually rotating shaft 33 with knob 22 one of the filters $F_0$, $F_1$, $F_2$ or $F_3$ will be moved in the path of the pickup 35 of the camera tube. At the same time, the shaft 33 moves the disc 22 of switch 29 such that the memories $M_1$, $M_2$ or $M_3$ will be selected to provide the outputs of RAMs 18 and 19 to digital to analog converters 20 and 21.

Although the invention has been described with respect to preferred embodiments, it is not to be so limited as changes and modifications can be made which are within the full intended scope of the invention as defined by the appended claims.

We claim as our invention:

1. A white balance control system for a color television camera having a plurality of manually controllable color temperature compensating filters comprising:
    (A) gain control means for electrically adjusting the white balance of a derived color video signal,
    (B) level comparing means responsive to said color video signal and connected to said gain control means for producing and supplying a plurality of sets of level setting signals to said gain control means, and
    (C) selection means for selectively supplying one of said plurality of sets of level setting signals to said gain control means.

2. A white balance control system as claimed in claim 1, wherein said selection means includes a plurality of color temperature compensating filters and said selection means of said one of said sets of level setting signals interconnected with said manually controllable color temperature compensating filters.

3. A white balance control system according to claim 2, wherein said level setting means includes a plurality of memory circuits corresponding to said plurality of color temperature compensating filters.

4. A white balance control system as cited in claim 3, wherein said memory circuits are digital memories, a digital to analog converter connected to the output of said memory circuits, and digital data from said digital memories supplied to said gain control means.

5. A white balance control system for a color television camera having a plurality of selectable color temperature filters which can be individually mounted in the scanning system, and producing a plurality of output color signals, comprising a plurality of amplifiers with variable gain controls receiving the plurality of output color signals from said color television camera, a first level comparator connected to first and second ones of said amplifiers, a second level comparator connected to said first and a third one of said amplifiers, first and second counters respectively connected to said first and second level comparators, first and second memory means each with a plurality of different storage portions, respectively, connected to said first and second counters and the first counter connected to the variable gain control of said second amplifier, said second counter connected to the variable gain control of said third amplifier, and switching means connected to said first and second memories to connect selected ones of said storage portions to said variable gain control means of said second and third amplifiers.

6. A white balance control system according to claim 5 wherein said switching means also controls which one of said selectable color temperature filters is utilized by said color television camera.

7. A white balance control system according to claim 6 wherein said switching means includes a rotatably supported disk with a plurality of bar magnets mounted to it, magnetic sensing means mounted adjacent said disc to sense the positions of said magnets and supplying inputs to said first and second memories, and said switch means connected to said plurality of selectable color temperature filters such that the output of said magnetic sensing means is correlated with the one of said filters used by said television camera.

8. A white balance control system according to claim 7 including a second disc to which said plurality of filters are attached and a shaft connected to said first and second discs to rotate them together.

9. A white balance system according to claim 8 wherein the angular positions of said magnets on said first disc are the same as the angular positions of said filters on said second disc.

10. A white balance system according to claim 9 including detent means engageable with said second disc to hold it in predetermined indexed positions.

* * * * *